No. 724,276. PATENTED MAR. 31, 1903.
A. FORGY.
CORN HARVESTER AND HUSKER.
APPLICATION FILED SEPT. 13, 1902.
NO MODEL. 3 SHEETS—SHEET 1.
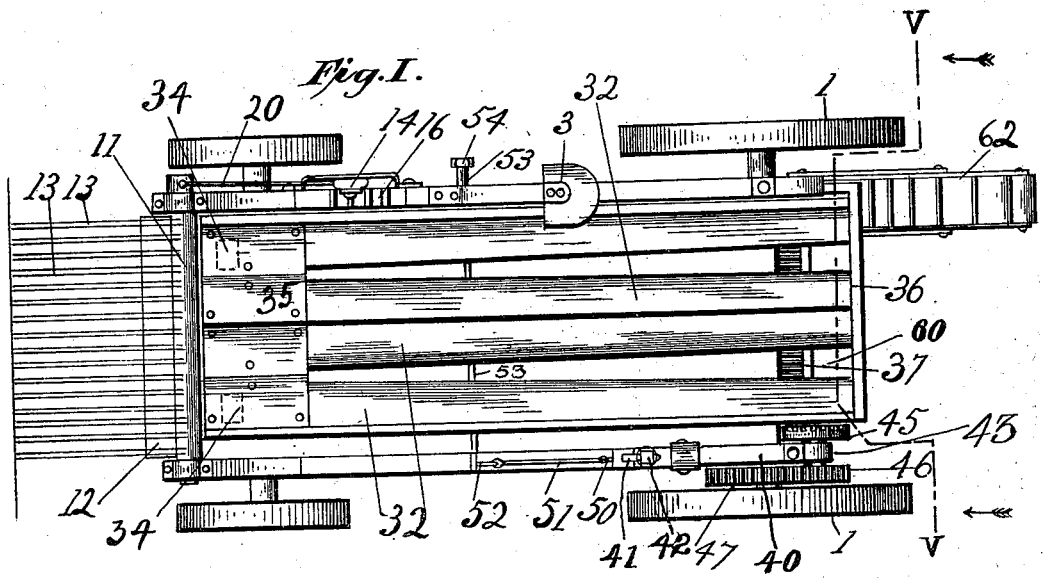
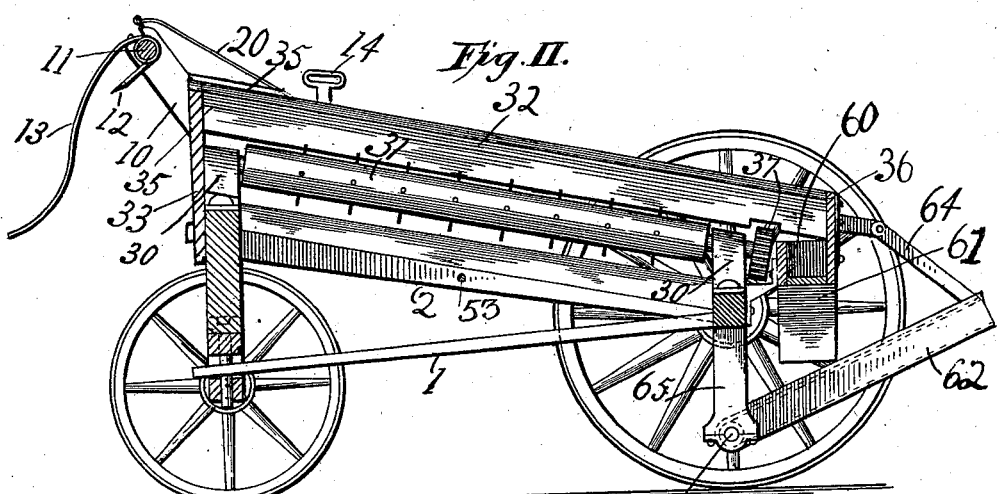
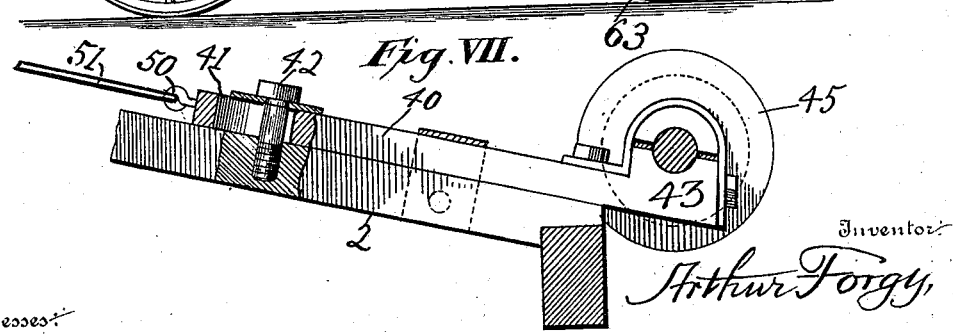
Witnesses:
Geo. E. Frech.
J. R. Martin.
Inventor:
Arthur Forgy,
By Collamer & Co.
Attorneys No. 724,276. PATENTED MAR. 31, 1903.
A. FORGY.
CORN HARVESTER AND HUSKER.
APPLICATION FILED SEPT. 13, 1902.
NO MODEL. 3 SHEETS—SHEET 2.
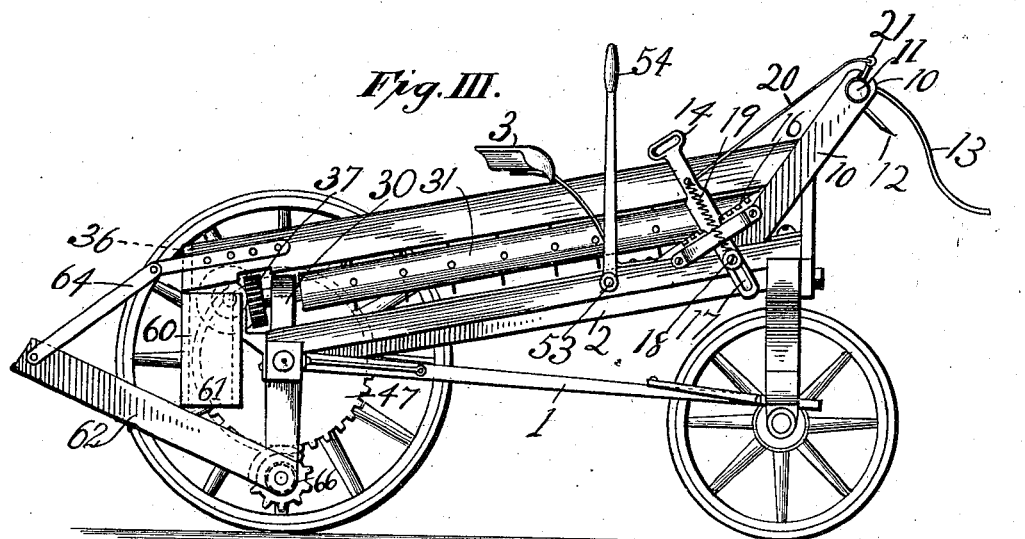
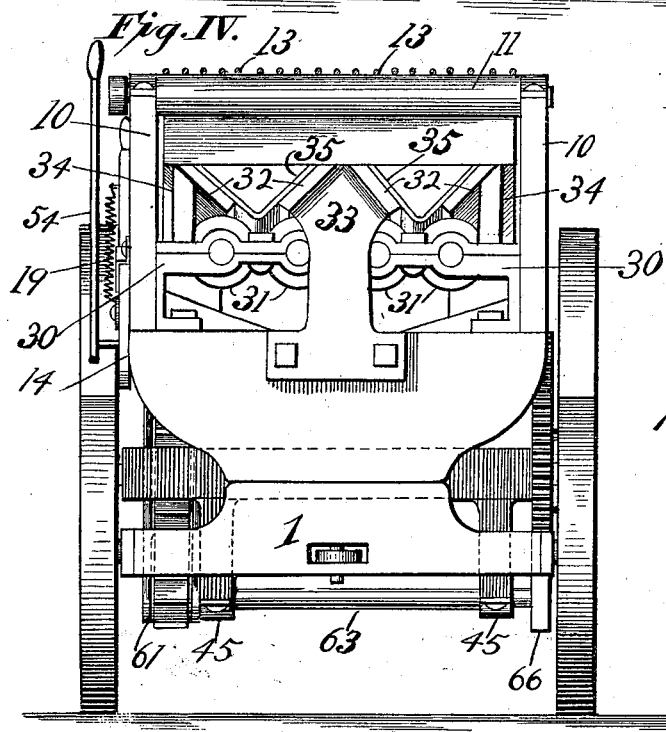
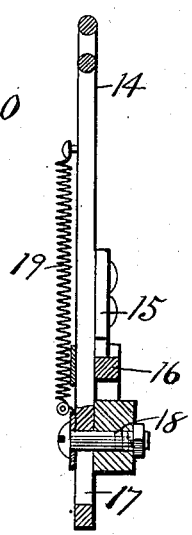

No. 724,276. PATENTED MAR. 31, 1903.
A. FORGY.
CORN HARVESTER AND HUSKER.
APPLICATION FILED SEPT. 13, 1902.
NO MODEL. 3 SHEETS—SHEET 3.
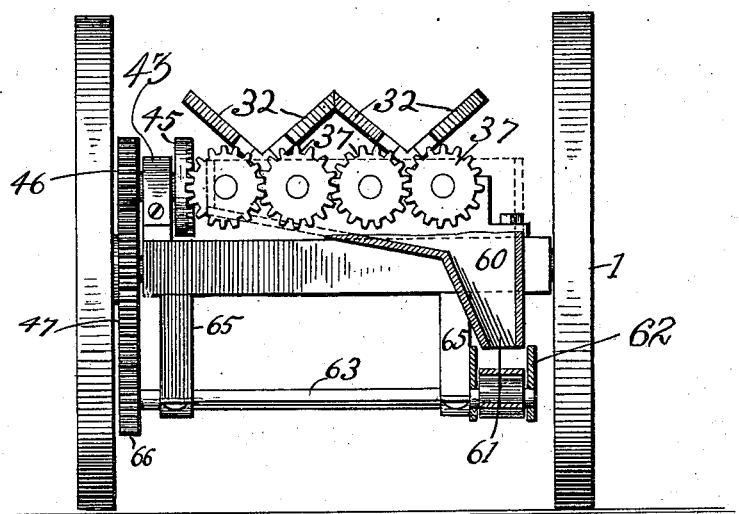
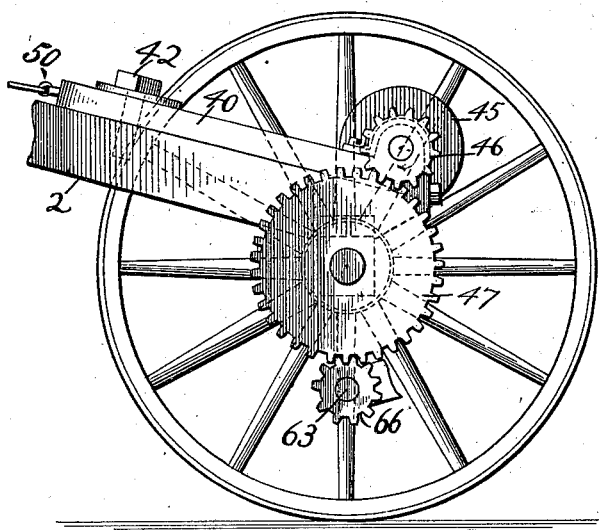
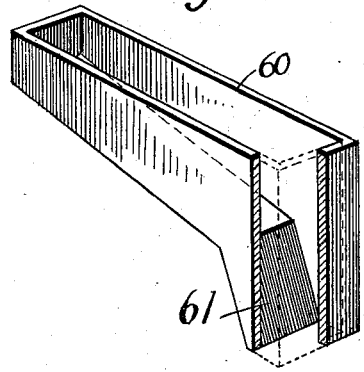
Witnesses
Geo. E. Frech.
J. R. Martin.
Inventor
Arthur Forgy,
By Collamer & Co.,
Attorneys

UNITED STATES PATENT OFFICE.

ARTHUR FORGY, OF MIDDLETOWN, MISSOURI.

CORN HARVESTER AND HUSKER.

SPECIFICATION forming part of Letters Patent No. 724,276, dated March 31, 1903.

Application filed September 13, 1902. Serial No. 123,252. (No model.)

*To all whom it may concern:*

Be it known that I, ARTHUR FORGY, a citizen of the United States, and a resident of Middletown, Montgomery county, State of Missouri, have invented certain new and useful Improvements in Corn Harvesters and Huskers; and my preferred manner of carrying out the invention is set forth in the following full, clear, and exact description, terminating with claims particularly specifying the novelty.

This invention relates to harvesters, and more especially to those machines which are adapted for gathering corn; and the object of the same is to effect improvements in devices of this character.

To this end the invention consists in a corn-husking machine embodying the details of construction which are elaborated in the description below and embraced in the claims appended, all as hereinafter more fully described and as shown in the accompanying drawings, wherein—

Figure I is a plan view of this machine complete. Fig. II is a central longitudinal section. Fig. III is a right side elevation with the nearmost wheels removed. Fig. IV is a front elevation. Fig. V is a rear elevation taken on sectional line V V of Fig. 1. Fig. VI is an enlarged detail of a portion of the machine viewed from the left side with the nearmost wheel removed and showing more particularly how the driving-wheel connects with the other mechanisms. Fig. VII is a still further enlarged detail of the slide. Fig. VIII is an enlarged sectional detail of the handle for adjusting the height of the fingers. Fig. IX is a perspective detail of the gutter and chute.

In the drawings, 1 is the running-gear supporting the bed 2, which carries the mechanism hereinafter described. As herein shown, the driver's seat 3 rises from the right side of the bed, although it could be located elsewhere or omitted entirely. This and other details constitute no part of the present invention.

Mounted in bearings 10, rising obliquely forward from the bed, is a roller 11, carrying a knife 12 and a series of fingers 13. These are preferably arranged rather high, because that portion of the cornstalk below the ears is hardly worth harvesting; but some means must be provided to pick up stalks which are bent down. Accordingly I provide a handle 14, having at one side of its body a pin 15, adapted to engage the teeth of a toothed or rack bar 16, which I can make straight instead of curved, as usual, by reason of the following construction: The body of this handle is longitudinally slotted, as at 17, and stands astride a bolt 18 in the bed, and a spring 19 at the other side of the handle draws it in such direction as to throw the pin 15 into the teeth of the rack-bar 16. The latter being above the bolt 18, the handle is thus held against movement in either direction until its pin is first raised out of engagement with the rack-bar and set into engagement with some other tooth. A rod 20 connects the handle with a pin 21, rising from the roller 11, and it is obvious that the driver (on his seat if the latter stands where shown) may at any moment oscillate the roller to cause the fingers to pick up a bent stalk or to work higher or lower, as the condition of the corn may require.

Mounted in suitable bearings 30 at front and rear are four stripping-rollers 31, arranged beneath two troughs, as best seen in Fig. V. Said troughs are composed of four boards set in section in the shape of a W, with their upper angle closed and their two lower angles slightly open and increasing in size toward the rear of the machine, as seen in Fig. I. Such boards 32 are supported on an arrowhead 33 at the front of the machine and also upon blocks 34, and they lie under a plate 35, which guides the ears into the troughs. Their rear ends may be connected to a board 36, standing upright, supported by the bed and closing the rear ends of the troughs, and over this board the stalks and tops will drop onto the ground behind in the operation of the machine. The four rollers are connected by intermeshing gears 37 at their rear ends, and to these suitable power is communicated. The means for driving them and for throwing them out of rotation, however, forms an important part of my invention.

In Figs. VI and VII is shown a slide 40, having a longitudinal slot 41, through which takes a set screw or bolt 42, passing into the bed 2, upon which the slide rests and moves. Preferably at its rear end this slide carries a bearing 43, in which is journaled a shaft, to whose inner end is fixed a rim-gear 45 and to whose outer end is fixed a plain gear 46, adapted to mesh with a driving-gear 47, which is fast on the axle of one of the supporting-wheels. When the slide is moved in one direction, the rim-gear engages one of the series of gears 37, and thus turns them all, its plain gear meanwhile simultaneously engaging the driving-gear 47. When the slide is moved in the other direction as far as slot 41 and bolt 42 will allow, both its rim-gear and its plain gear disengage the gears with which they formerly engaged, and rotation of the rollers immediately ceases. It will be seen that this movement of the slide carries its plain gear radially out of the teeth of the driving-gear and also simultaneously carries the teeth of its rim-gear out of the teeth of the driven gears in a direction parallel with their axes.

Although any preferred means may be employed for moving the slide 40, I have shown the following-described arrangement in the accompanying drawings: Secured as by a screw-eye 50 in the front end of the slide is a link 51, extending along the left side of the bed 2 and connected with a short crank 52 at that end of a transverse shaft 53 which passes transversely through the bed beneath the husking mechanism, and rising from the other end of this shaft adjacent the seat 3 is a hand-lever 54. When the latter is moved, the shaft is oscillated and the crank 52 moves the slide 40 in either direction in a manner which will be clear.

Beneath the rear ends of the troughs is secured a runway or gutter 60, which inclines in the present instance toward the right side of the machine and delivers into a chute 61, and by this runway the husked ears are collected as they drop out at the rear ends of the troughs and are delivered through the chute.

62 designates an elevator, whose details I will not describe further than to say that its inner lower end is supported on a shaft 63 and its body is held at the desired angle by a brace 64. 65 designates hangers depending from the bed and supporting said shaft 63, and 66 is a gear-wheel on the latter meshing with the driving-gear 47, by which means movement at a proper speed is imparted by said wheel to the elevator. Thus it will be clear from the drawings that the inner end of the elevator-frame stands beneath the hopper 61, and hence husked ears which are delivered thereby are raised by the elevator and dropped into a wagon, which is driven in rear or alongside of this machine, as is usual in the art.

Other details not herein described may be used in connection with my invention, or many of the details herein may be altered to a considerable extent, if desired. The sizes, shapes, proportions, and materials of parts are not essential, and I consider the gist of the present invention to be set forth in the following claims.

What is claimed as new is—

1. In a corn-husking machine, the combination with a bed, husking-rollers therein, and means for rotating such rollers oppositely in pairs; of troughs consisting of pairs of boards standing oblique above the rollers with the lower edges of the members of each pair diverging slightly from each other toward the rear of the machine, a cutting apparatus at the front end of these troughs, and a delivery apparatus at their rear end embracing a transverse runway standing beneath their most widely separated points.

2. In a corn-husking machine, the combination with the bed mounted on a running-gear, a central arrow-head and two blocks at its front end, two troughs consisting of four oblique boards arranged in W shape and mounted at their front ends on said arrow-head and blocks, and a transverse upright board across their rear ends, the lower edges of the two pairs of boards being slightly spaced and the members of each pair diverging from each other toward said rear board; of husking-rollers located beneath the openings between the boards, means for rotating the rollers oppositely in pairs, a cutting mechanism at the front end of the machine, and mechanism at the rear end thereof for collecting the husked ears as they fall through the openings in the troughs.

3. In a corn-husking machine, the combination with the framework, the husking mechanism carried thereby, and means for delivering the husked ears; of bearings projecting upward and forward from said framework, a roller journal therein, a knife projecting forward from the under side of the roller, long fingers projecting forward and curving downward from its upper side, and means for adjusting this roller in its bearings, as and for the purpose set forth.

4. In a corn-husking machine, the combination with the framework, the husking mechanism carried thereby, and means for delivering the husked ears; of a cutting apparatus at the front end of the machine, a roller mounted in bearings also at the front end, fingers projecting forward from the roller, a pin in the latter, a longitudinally-slotted handle connected by a rod with said pin, a bolt over which its slot moves, a straight rack-bar fixed to the framework above said bolt, a pin in the handle above the rack-bar, and a spring drawing the handle bodily and normally in a direction to engage said pin with the teeth of the rack-bar.

5. In a corn-husking machine, the combination with the framework, the husking-rollers located therein and connected by intermeshing gears, the troughs above said rollers, and a cutting apparatus at the front ends of the troughs; of the supporting-wheels having a driving-gear, a slide movable on the framework and carrying a bearing, a shaft journaled therein and having a plain gear at one end adapted to mesh with the driving-gear and a rim-gear at its other end adapted to mesh simultaneously with one of the intermeshing gears on the husking-rollers, a hand-lever connected to the slide for moving the same.

6. In a corn-husking machine, the combination with the framework, the husking-rollers located therein and connected by intermeshing gears, the troughs above said rollers, the cutting mechanism above the front end of the troughs, delivering mechanism beneath their rear ends including an elevator, and a transverse driving-shaft for the latter; of the supporting-wheels having a driving-gear, a slide movable on the framework and carrying a bearing, a shaft journaled therein and having a plain gear at one end adapted to mesh with the driving-gear and a rim-gear at its other end adapted to mesh simultaneously with one of the intermeshing gears on the husking-rollers, and constant connection between said driving-gear and the elevator-shaft.

In testimony whereof I have hereunto subscribed my signature this the 22d day of August, A. D. 1902.

ARTHUR FORGY.

Witnesses:
M. E. VERMILLION,
J. H. ROBINSON.